United States Patent [19]

Anderson et al.

[11] 4,081,733
[45] Mar. 28, 1978

[54] AUTOMATIC CONTROL SYSTEM WITH INTEGRATOR OFFSET

[75] Inventors: George H. Anderson; William J. Barrett, both of Rockford, Ill.

[73] Assignee: Barber-Colman Company, Rockford, Ill.

[21] Appl. No.: 700,970

[22] Filed: Jun. 29, 1976

[51] Int. Cl.² .................................. G05B 11/36
[52] U.S. Cl. ........................ 318/610; 318/621; 318/609
[58] Field of Search ............ 318/561, 609, 610, 565, 318/621

[56] References Cited

U.S. PATENT DOCUMENTS 3,588,658  6/1971  Van Der Sluys et al. .......... 318/565
3,778,696  12/1973  Walters et al. ................... 318/565
3,819,999  6/1974  Platt .............................. 318/609

Primary Examiner—Robert K. Schaefer
Assistant Examiner—John J. Feldhaus
Attorney, Agent, or Firm—McDougall, Hersh & Scott

[57] ABSTRACT

An automatic control system wherein repetitive pulses, the frequency of which is responsive to a remote condition, such as prime mover RPM, are converted to a DC voltage level. The voltage level is compared to a reference by a difference amplifier to produce an error signal. Further signals are produced from the error signal, including an integral thereof, which signals are ultimately used to control the remote condition. The integrator is provided with an offset circuit to prevent saturation thereof during override of the normal control signal by an external limit signal as, for example, excessive engine temperature or smoke output.

7 Claims, 3 Drawing Figures

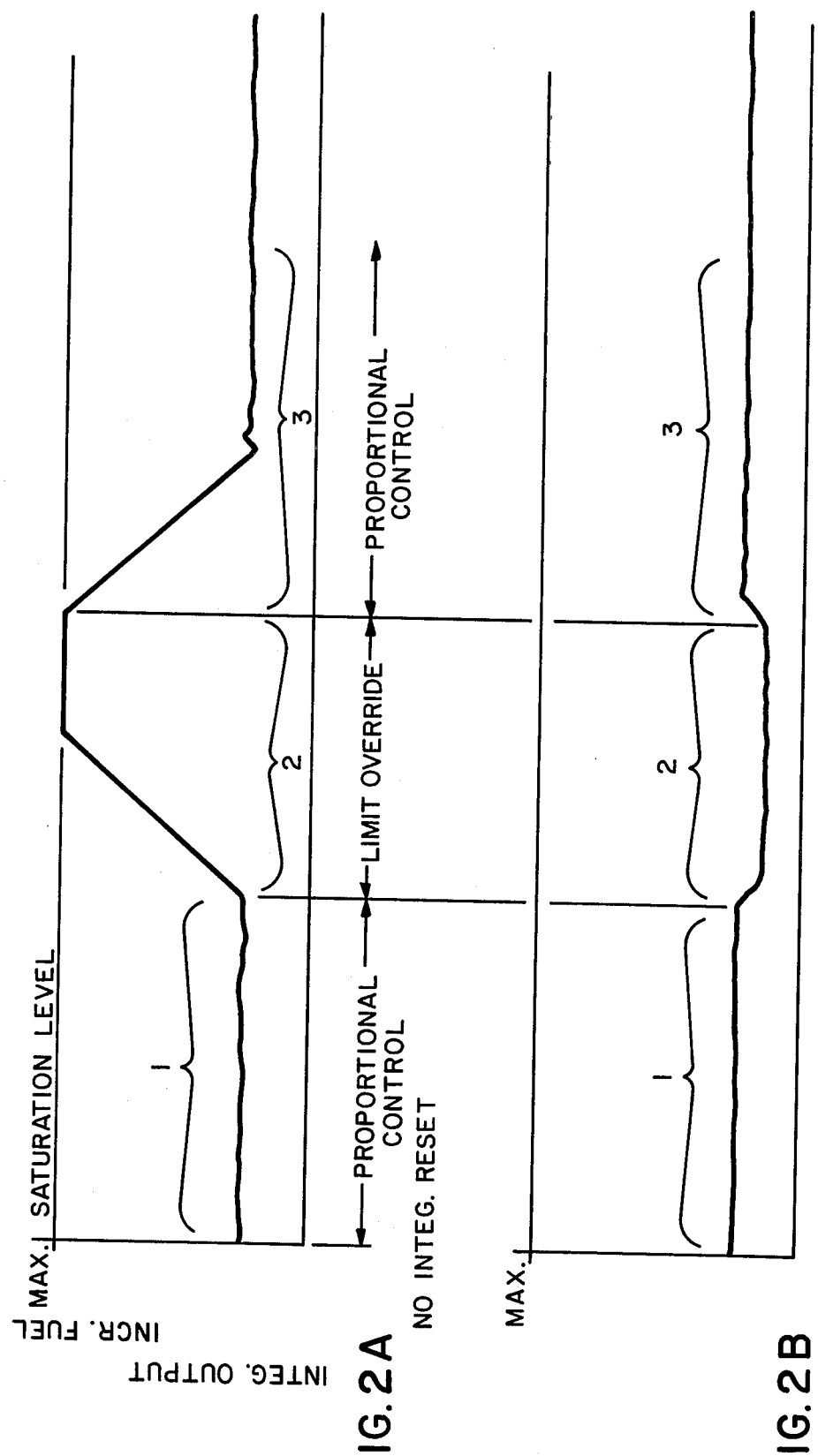

AUTOMATIC CONTROL SYSTEM WITH INTEGRATOR OFFSET

BACKGROUND OF THE INVENTION

This invention relates generally to automatic control systems. More specifically, it relates to electric control systems wherein the control signals utilized are combined functions of a proportional signal and the integral and derivative thereof.

Automatic control systems are known in the art. Such systems receive electrical signals representative of a condition of an element to be controlled and compare that signal with a reference to produce an error signal. A particular application of such control systems has been as governors controlling the speed (RPM) of internal combustion engines.

In many applications it is desired to control engine RPM to maintain constant speed in spite of variations of engine load. It is desirable to provide a system wherein the transient response, that is, the response time of the engine and the control system, due to a change in operating conditions, is minimized. This avoids over speed, hunting and instability conditions potentially damaging to the system.

An automatic control system having the characteristics desired for the aforementioned uses is disclosed in co-pending U.S. Pat. application Ser. No. 538,133 filed Jan. 2, 1975, and assigned to the present assignee. In that application, which is hereby incorporated by reference, an automatic control system is described in which engine speed is sensed by a magnetic pickup coil. After wave shaping and amplification the wave form is applied through an isolating switch arrangement to the input of an operational amplifier. This amplifier compares the average DC level against a reference to generate an error signal. The error signal is then differentiated and integrated with respect to time. A signal proportional to the error signal, its integral and its derivative are combined to produce a control signal for operating an actuator device which may control a fuel valve or throttle linkage. By use of a feedback element associated with the actuator, accurate control over the device is obtained.

In order for safe operation of the controlled device, it is often necessary to provide one or more external condition limit circuits. Such circuits generate an overriding control signal in the event that a detected condition occurs. Such conditions include excessive engine temperature, excessive smoke, improper manifold pressure, and the like. When such a condition occurs, it is desired to override the automatic control circuit regardless of the normal operating conditions, such as engine speed, and to lower the operating speed of the engine or shut it down altogether depending upon the considerations involved.

When a limit control overrides the automatic control system, the integrator circuit of the control system is "fooled" by the continued operation of the engine at a value other than that specified by the automatic control. This causes the integrator to begin operating in a manner disadvantageous to precise control when the controlling external limit is removed.

If no provision is made for offsetting the integrator during operation of a limit, then for a considerably long period of time after the external limit is removed the integrator will cause the automatic control system to operate in an improper manner as, for example, hunting for the set point. This is because the integrator output is utilized as one measure of the amount of error between the set speed and the actual operating speed. Therefore, if the integrator is considerably away from its proper value, the circuit will not provide as precise control as is otherwise obtainable.

It is accordingly an object of the invention to provide an integrator offset circuit which will prevent the integrator from saturating during a period of operation in which an external limit overrides the automatic control system.

It is another object of the invention to provide an integrator offset circuit which, responsive to the presence of an external control condition, maintains an integrator circuit in a desired operating region for the duration of the applied external limit signal.

A further object of the invention is to provide an integrator offset circuit for an automatic control system.

Other objects and advantages of the invention will be apparent from the remaining portion of the specification.

BRIEF DESCRIPTION OF THE DRAWINGS

FIGS. 2A and B are integrator output wave forms useful in understanding the circuit of FIG. 1.

DETAILED DESCRIPTION

Figure 1:
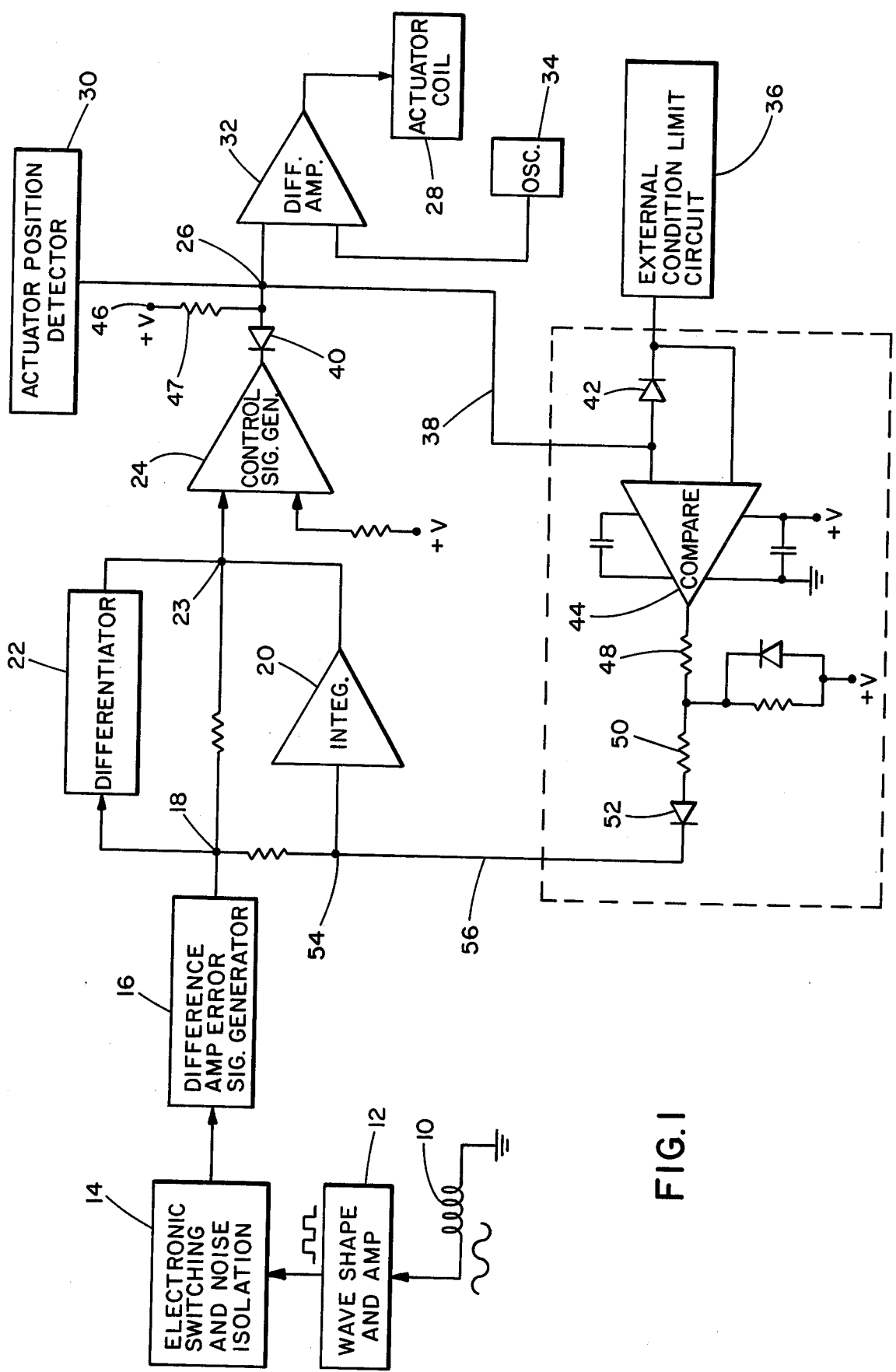
FIG. 1 is a block diagram of an automatic control circuit illustrating schematically the integrator offset circuit according to the invention.

Referring to FIG. 1, a block diagram of the control system according to the invention is illustrated. As indicated in the background portion, a basic control system of the type for which the present invention is intended is disclosed and described in detail in U.S. Pat. application Ser. No. 538,133. That application, incorporated by reference, is referred to for the specific circuit details of the indicated blocks not otherwise discussed in the present application.

The RPM of a prime mover, such as a diesel engine or similar internal combustion engine, is detected by a magnetic pick-up coil 10. The sinusoidal wave form produced by the coil is received by wave shaping and amplifier circuit 12 which produces square wave pulses therefrom. The series of pulses, the frequency of which is proportional to the detected RPM of the engine, is fed through an electronic switching and noise isoltion circuit 14. This circuit produces an average DC voltage level proportional to the received pulses from the wave shaper block 12. The average DC signal is applied to the difference amplifier circuitry 16 for producing an error signal at junction 18. The error signal is integrated by integrator 20 and differentiated by a differentiator 22. A signal proportional to the error signal, its integral and its derivative are summed at junction 23 and applied to a control signal generator 24, the output of which is provided at junction 26.

A control element, the state of which is controlled by the signal at junction 26, may be constituted by any number of devices. In the case of an engine governor, the control element may be a fuel valve operated by an actuator. The position of the valve is determined by the energization state of the actuator solenoid coil, such as, coil 28. The state of energization is, of course, a function of the average current through the coil. In order to provide a signal representative of the actual position of the valve, a feedback element, such as a potentiometer, is mechanically connected to the solenoid actuator so as to produce a feedback voltage representative of position.

The feedback element 30 applies a voltage to the junction 26. Junction 26 is the input to a difference amplifier 32, which amplifier compares the magnitude of the control signal with the magnitude of the feedback signal. The difference between the signals, if any, is supplied as one input to the amplifier circuit 32. A sawtooth wave oscillator 34 is applied to the other input of the difference amplifier 32 to produce a pulse width modulated signal at the output of the amplifier which determines the average current flowing through the actuator coil 28.

The circuit thus far described and as described in greater detail in the aforementioned U.S. Pat. application, thus provides an automatic control circuit to maintain an engine or other prime mover at a regulated operating condition, for example, constant speed. Additionally, the circuit may include the provision of an external limit override circuit 36 which can override the signal from the control signal generator 24 upon detecting selected conditions, such as, high temperature, excessive smoke, improper manifold pressure, etc.

When one of the monitored external limited conditions occurs, the normal operation of the control circuit is altered. Instead of driving the difference amplifier 32 based on the control signal produced by amplifier 24, amplifier 32 is instead driven by a signal provided from the condition limiting circuit 36 via line 38. The amplifier 24 is effectively removed from the circuit by means of diode 40. Normally the control signal is provided via diode 40 to junction 26. This signal is normally negative. If no external limit signal is present at the junction 26, diode 40 conducts. However, when an external condition limit signal is provided on line 38, which signal is more negative than the control signal, diode 40 is reverse biased and will not conduct. The external signal from line 38 together with the feedback signal from the position detector 30 then determines the output from the difference amplifier 32.

When an external override occurs, the integrator 20 is unaware of this condition. In the absence of circuitry according to the present invention, the integrator circuit merely detects the fact that the controlled device, i.e., the prime mover, is no longer operating in the selected range due to the increase in the error signal at junction 18.

The output from the integrator under such a circumstance as illustrated in FIG. 2A. This graph is a schematic representation of the integrator output versus time. Over segment 1 the circuit is operating normally and the output from the integrator is substantially constant assuming the engine is performing normally. Over segment 2 an external limit condition has overriden the normal operation of the circuit and slowed the engine down due, for example, to excessive heat or smoke. As the engine PRMs decrease, the error signal will increase causing an increase in the integrator output which continues until the integrator enters saturation. Stated differently, the integrator sees a constant error at junction 18 and goes to its maximum output in an effort to generate a signal which will correct the error.

During segment 3 the limit override ceases and control of the engine is returned to the control circuit. However, since the integrator has been allowed to reach positive saturation, its output is now far from the desired level for quickly achieving and maintaining set point operation of the prime mover. Its output will, over a period of time, return to the proper level but for the period indicated at segment 3 the automatic control circuit will not provide highly satisfactory control. Offset or droop is likely to occur.

In order to overcome this problem, particularly where external limit conditions occur on a frequent basis, it is desirable to offset or reset the integrator 20 during periods when the external condition limit is in effect. Stated differently, it is desirable to clamp to a selected level the output of the integrator during the occurrence of an external condition limit.

The effect of clamping or offsetting the integrator is illustrated in FIG. 2B. This graph is the same as 2A over segment 1, the normal operation of the control circuit. Over segment 2, however, when the external limit overrides circuit operation, the offset circuit to be described prevents the integrator from reaching positive saturation and maintains it at a value at or slightly below its value at the time the limit override went into effect. Over segment 3, when the limit is removed, the integrator quickly resumes its proper output level for providing accurate information to the control signal generator 24.

Referring again to FIG. 1, the offset or clamping circuit according to the invention is illustrated. The occurrence of an external limit condition from circuit 36 is detected by a diode 42 placed across the inputs of an operational amplifier 44. Amplifier 44 acts as a switch and goes from positive saturation to negative saturation depending upon whether diode 42 is forward or reversed biased. As will be apparent, diode 42 is forward biased when the limit circuit 36 is overriding the automatic control circuit since the signal produced by the limit circuit is negative. Current is conducted from the positive voltage source 46 through resistor 47, line 38, and diode 42. This forward biases the diode sending the amplifier 44 into positive saturation.

Amplifier 44 is an operational amplifier. The output of the amplifier is provided via resistors 48, 50 and diode 52 to junction 54 of the integrator. When the external limit is in effect, the amplifier 44 goes into positive saturation. The output of the amplifier is then provided to the junction 54 where it is subtracted from the error signal generated by amplifier 16. That is, when a limit signal occurs reducing the engine RPM from that maintained by the automatic control circuit, an error signal of a first polarity, for example, negative, is produced at terminal 18. In turn, this error signal is provided to terminal 54 and integrator 20.

The signal generated by the offset or clamping portion of the circuit is of an opposite polarity from the error signal, in this case positive. Its magnitude is chosen to be of a value equal to or greater than the error signal normally encountered over a selected operating range for a given application. If the clamping signal provided on line 56 slightly exceeds the error signal, the wave form illustrated in FIG. 2B, segment 2, is obtained. The value provided on line 56 can be adjusted as necessary for a given application.

When the external limit ceases to block operation of the control signal generator 24, diode 42 will cease condition. Amplifier 44 will then saturate low and the positive signal will be removed from line 56 permitting the integrator 20 to respond to the error signal provided from terminal 18.

While we have shown and described embodiments of this invention in some detail, it will be understood that this description and illustrations are offered merely by way of example, and that the invention is to be limited in scope only by the appended claims.

We claim:

1. In an automatic control circuit including means for generating an error signal, means for generating the integral thereof, means for producing a control signal from said error signal and said integral and including means for producing an external limit signal to override said control signal, the improvement comprising:

means for altering the input to said integrator means when said external limit signal overrides the control signal to maintain the output of said integrator means in the normal operating region for subsequent control signal generation after said external limit signal ceases to override said control signal, said altering means including an operational amplifier applying a signal to said integrator means input of a polarity opposite to the polarity of said error signal and of a magnitude substantially equal to or greater than said error signal.

2. The circuit according to claim 1 wherein said means for altering includes means for detecting the presence of said external limit signal.

3. The circuit according to claim 1 wherein said altering means includes an operational amplifier connected as a difference amplifier.

4. The circuit according to claim 1 wherein said integrator means is an operational amplifier connected as an integrator.

5. The circuit according to claim 2 wherein said detecting means is a diode placed in circuit with said means for producing an external limit signal.

6. The circuit according to claim 5 wherein said altering means includes an operational amplifier connected as a comparator, the inputs of which are connected across said diode, a first output from said amplifier resulting if a limit signal is detected by said diode while a second output, of opposite polarity, resulting if no limit signal is detected.

7. The circuit according to claim 6 wherein said integrator means is an operational amplifier connected to integrate said error signal and wherein said difference amplifier output is also connected to the input of said integrator amplifier, said first output being of opposite polarity and of substantially the same magnitude as said error signal whereby during the existence of a limit override the integrator amplifier output is clamped to its approximate value immediately prior to the occurrence of the limit override.

* * * * *